United States Patent [19]

Aramaki et al.

[11] Patent Number: 5,544,139
[45] Date of Patent: Aug. 6, 1996

[54] METHOD AND APPARATUS FOR DISPLAYING DISC NAME READ FROM A DISC

[75] Inventors: Junichi Aramaki; Teppei Yokota, both of Chiba, Japan

[73] Assignee: Sony Corporation, Tokyo, Japan

[21] Appl. No.: 449,570

[22] Filed: May 24, 1995

Related U.S. Application Data

[63] Continuation of Ser. No. 63,153, May 18, 1993, abandoned.

[30] Foreign Application Priority Data

May 22, 1992 [JP] Japan .................................. 4-155721
May 25, 1992 [JP] Japan .................................. 4-157412

[51] Int. Cl.⁶ .................................................... G11B 7/00
[52] U.S. Cl. .............................. 369/58; 369/32; 369/53
[58] Field of Search ............................. 369/58, 48, 50, 369/44.32, 33, 34, 32, 54, 47, 53; 358/335

[56] References Cited

U.S. PATENT DOCUMENTS

| | | | |
|---|---|---|---|
| 4,723,181 | 2/1988 | Hirkok | 369/15 |
| 4,772,962 | 9/1988 | Tanaka et al. | 369/33 |
| 4,779,252 | 10/1988 | Custers et al. | 369/33 |
| 4,817,075 | 3/1989 | Kikuchi et al. | 369/33 |
| 4,872,151 | 10/1989 | Smith | 369/33 |
| 4,899,326 | 2/1990 | Takeya et al. | 369/33 |
| 4,953,035 | 8/1990 | Yoshio | 358/335 |
| 4,989,195 | 1/1991 | Suzuki | 369/50 |
| 5,111,442 | 5/1992 | Nakajima et al. | 369/54 |
| 5,124,963 | 6/1992 | Ando | 369/32 |
| 5,136,569 | 8/1992 | Fennema et al. | 369/53 |
| 5,157,643 | 10/1992 | Suzuki | 369/33 |
| 5,159,670 | 10/1992 | Suzuki et al. | 369/34 |
| 5,161,281 | 11/1992 | Mankovitz | 369/47 |
| 5,177,720 | 1/1993 | Kondo | 369/48 |
| 5,177,728 | 1/1993 | Otsubo et al. | 369/58 |
| 5,228,021 | 7/1993 | Sato et al. | 369/58 |
| 5,233,576 | 8/1993 | Curtis et al. | 369/53 |
| 5,268,889 | 12/1993 | Furukaw et al. | 369/47 |
| 5,288,982 | 2/1994 | Hosoya | 369/58 |
| 5,289,451 | 2/1994 | Ashinuma et al. | 369/47 |
| 5,315,570 | 5/1994 | Miura et al. | 369/48 |
| 5,317,549 | 5/1994 | Maeda et al. | 369/58 |
| 5,349,577 | 9/1994 | Mikamo | 369/47 |

FOREIGN PATENT DOCUMENTS

| | | |
|---|---|---|
| 1-331825A1 | 9/1989 | European Pat. Off. . |
| 61-107587 | 5/1986 | Japan . |
| 62-259279 | 11/1987 | Japan . |
| 1-0677885 | 3/1989 | Japan . |
| 1-261992 | 10/1989 | Japan . |
| 2-50352 | 2/1990 | Japan . |
| 2-187979 | 7/1990 | Japan . |
| 2-301073 | 12/1990 | Japan . |
| 4-141857 | 5/1992 | Japan . |

*Primary Examiner*—Nabil Z. Hindi
*Attorney, Agent, or Firm*—Limbach & Limbach L.L.P.

[57] ABSTRACT

A display method comprises the steps of: detecting for a disc having a first record region and a second record region, the first record region being adapted for recording a plurality of programs, the second record region being adapted for recording at least catalog information such as number information and time information of the plurality of programs recorded in the first record region, whether or not title information such as a disc name and a track name has been recorded; displaying the catalog information on the display portion when the detection result represents that the title information has not been recorded in the second record region of the disc; and display the title information on the display portion when the detection result represents that the title information has been recorded in the second record region of the disc.

8 Claims, 12 Drawing Sheets

METHOD AND APPARATUS FOR DISPLAYING DISC NAME READ FROM A DISC

This is a continuation of application Ser. No. 08/063,153 filed on May 18, 1993, now abandoned.

BACKGROUND OF THE INVENTION

1. Field of the Invention

The present invention relates to a display method for a disc reproducing apparatus. More particularly, the present invention relates to a display method for displaying a title or the like in an optical disc recording and/or reproducing apparatus for recording and/or reproducing an optical disc or a magnetooptical disc.

2. Description of the Prior Art

In the above-mentioned optical disc recording and/or reproducing apparatus, digital audio disc player, and so-called compact disc player, a desired music program or a desired program is selected according to a program number displayed on the display portion of the apparatus and player. At this point, the user of the apparatus or the player will select a desired music program or a desired program with reference to a brochure and/or an index card with which the optical disc for use is provided.

Moreover, the following program selection method is available.

A digital audio disc player, namely a compact disc player which reproduces music a compact disc, is provided with a plurality of input keys for inputting the alphabet or the like and a memory such as RAM. In the player, a music program name and/or a disc title recorded on a disc is input with input keys so as to cause the memory to store such data. It is determined whether or not abbreviations of music programs, music program names, and title of the disc loaded in the player have been input to the memory thereof. As the determination method, a method disclosed in, for example, U.S. Pat. No. 4,779,252 can be used.

When it has been determined that such information of music program names of the disc loaded in the player has been input to the memory of the player, the user can select a desired music program according to information such as abbreviations and names of music programs displayed on the display portion of the player.

In the first selection method of the selection methods mentioned above, the user of the player will input the numeric value or number corresponding to a desired music program or a desired program with reference to the brochure and index card to select the desired music program of the desired program. Thus, the optical head of the player is traveled to the position corresponding to the music program or the program according to the numeric value or number being input. Thereafter, the optical head reads a designated numeric value or number of the optical disc. On the other hand, in the second selection method, different operations are performed according to the determination result of the disc loaded in the player. When it has been determined that the memory of the player has stored information such as music program names and title of the disc loaded therein, it causes the display portion to display information stored in the memory. Thus, the user of the player can select a desired music program or the desired program with reference to music program names and titles displayed on the display portion. When it has been determined that the memory of the player has not stored information such as music program names and title of the disc loaded therein, the user will perform a selection operation according to a selection method similar to the first selection method.

However, in the first selection method, whenever the user selects a desired music program or a desired program, he or she need perform a selection operation with reference to the brochure and/or index card with which the disc for use is provided. Thus, the selection operation becomes troublesome. Moreover, in the second selection method, when a disc whose information has been stored in the memory of the player is used, this operation is easier than the operation of the first selection method. However, when a disc whose information has not been stored in the memory is used, the same problem as the first selection method results.

Furthermore, the second selection method has the following problems. First, the user most input information of a disc to the player with reference to the brochure and/or index card with which the disc is provided. Since the memory of the player has a limited amount of storage capacity, it cannot store information of a number of discs. In other words, to register information such as music program names and titles of a large number of discs to the player, a large amount of storage capacity is required. In addition, since the length of information of music program name and title varies disc by disc, it may not be recorded in the memory.

OBJECTS AND SUMMARY OF THE INVENTION

An object of the present invention is to provide a display method which can automatically display a disc name and track names in the case where they have been recorded on a disc.

Another object of the present invention is to provide a disc reproducing apparatus which can automatically display a disc name and track names in the case where they have been recorded on a disc.

According to a first aspect of the present invention, there is provided a display method comprising the steps of: detecting for a disc having a first record region and a second record region, the first record region being adapted for recording data, the second record region being adapted for recording at least catalog information of the data recorded on the first record region, whether or not a title information has been recorded on the second record region; displaying the catalog information on a display portion when the detection result represents that the title information has not been recorded on the second record region of the disc; and displaying the title information on the display portion when the detection result represents that the title information has been recorded on the second record region of the disc.

According to a second aspect of the present invention, there is provided a disc reproducing apparatus for reproducing a disc having a first record region and a second record region, the first record region being adapted for recording data, the second record region being adapted for recording at least catalog information of the data recorded in the first record region, the disc reproducing apparatus comprising; a head; a memory for storing the data recorded in the second record region of the disc with a signal read out by the head; a display portion for displaying the data stored in the second record region of the disc; a determination means for determining whether or not a disc name or a track name has been recorded in the second record region of the disc according to a signal read out by the head; and control means for controlling operations of the memory and the display portion so as to read the catalog information from the memory and display the catalog information on the display portion when the determination result represents that the disc name and/or the track name has not been recorded in the second record region of the disc and to read the disc name and/or the track name from the memory and display the disc name and/or the track name on the display portion when the determination result represents that the disc name and/or the track name has been recorded in the second record region of the disc.

According to the present invention, when a disc has recorded title information such as a disc name and track names, they can be automatically displayed on the display portion of a recording and/or reproducing apparatus. In addition, according to the present invention, a selection operation can be easily performed.

The above, and other, objects, features and advantage of the present invention will become readily apparent from the following detailed description thereof which is to be read in connection with the accompanying drawings.

DETAILED DESCRIPTION OF THE PREFERRED EMBODIMENT

Figure 1:
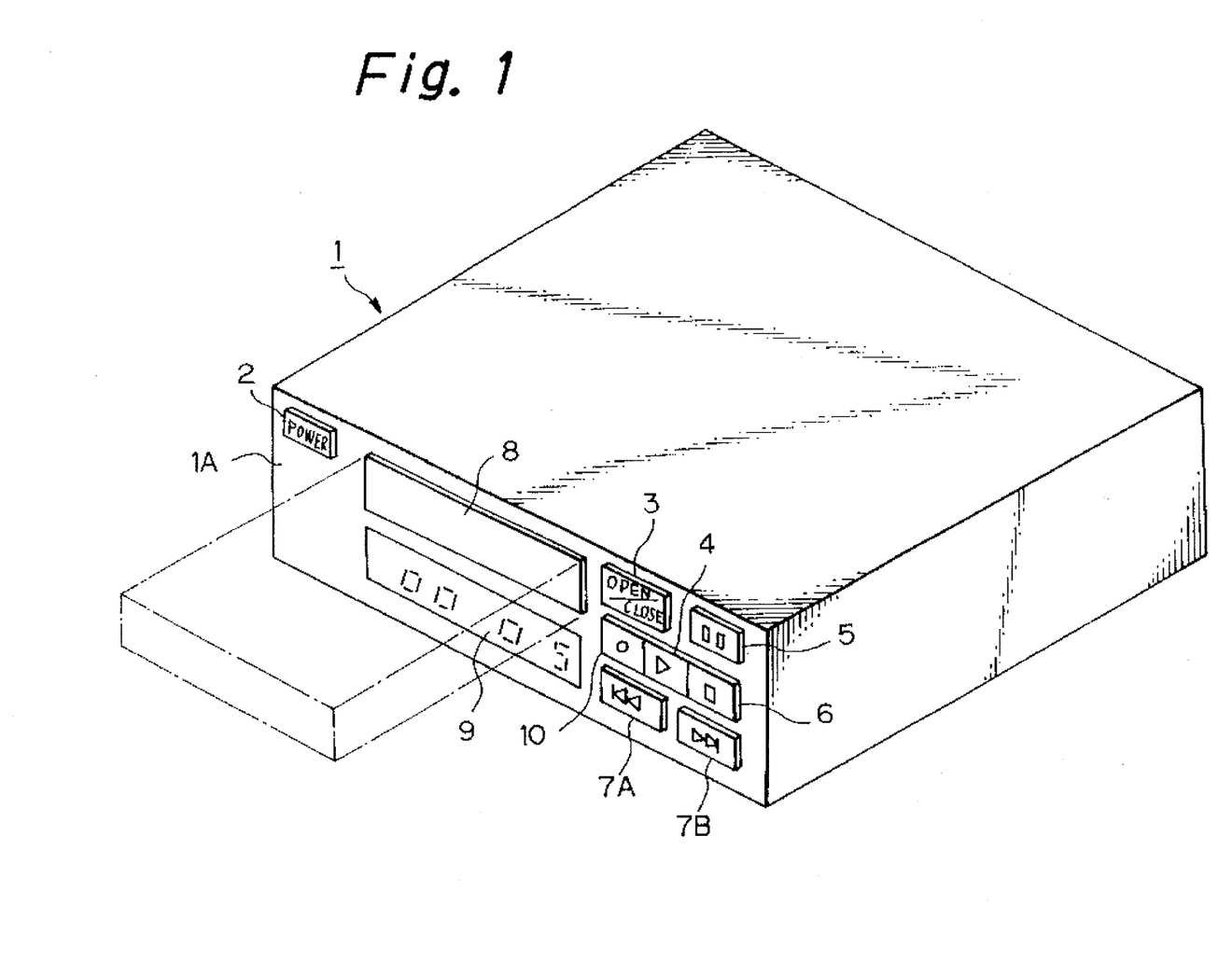
FIG. 1 is a perspective view showing the external overall construction of an optical disc recording and/or reproducing apparatus to which the present invention has been applied.

An embodiment of the present invention will now be described hereunder with reference to the accompanying drawings. FIG. 1 is a perspective view showing an external overall construction of an optical recording and/or reproducing apparatus to which the present invention has been applied. In FIG. 1, on a front panel 1A of the optical disc recording and/or reproducing apparatus 1, a display 9 is disposed. In addition, on the front panel 1A of the optical disc recording and/or reproducing apparatus 1, a power key 2, an OPEN/CLOSE key 3, a reproduction key 4, a pause key 5, a stop key 6, AMS keys 7A and 7B, and a record key 10 are disposed. Reference numeral 8 denotes a disc tray which is pulled from an opening of the front panel 1A.

When the OPEN/CLOSE key 3 is operated, the disc tray 8 is pulled out as shown by alternate long and short dash lines of the figure. On the disc tray 8, an optical disc (not shown in the figure) is mounted. When the OPEN/CLOSE key 3 is operated again, the tray 8 is pulled into the apparatus 1. The optical disc is loaded in a recording and/or reproducing portion within the apparatus 1.

On the display 9, time information such as the total play time of the optical disc being loaded, the elapsed time of a music program being reproduced, the remaining play time of the music program being reproduced, and the remaining play time of the remaining music programs and the track number of the music program being reproduced are displayed. In addition, for a disc on which a disc name and a track name which have been recorded, the disc name and truck name are displayed on the display 9.

Figure 2:
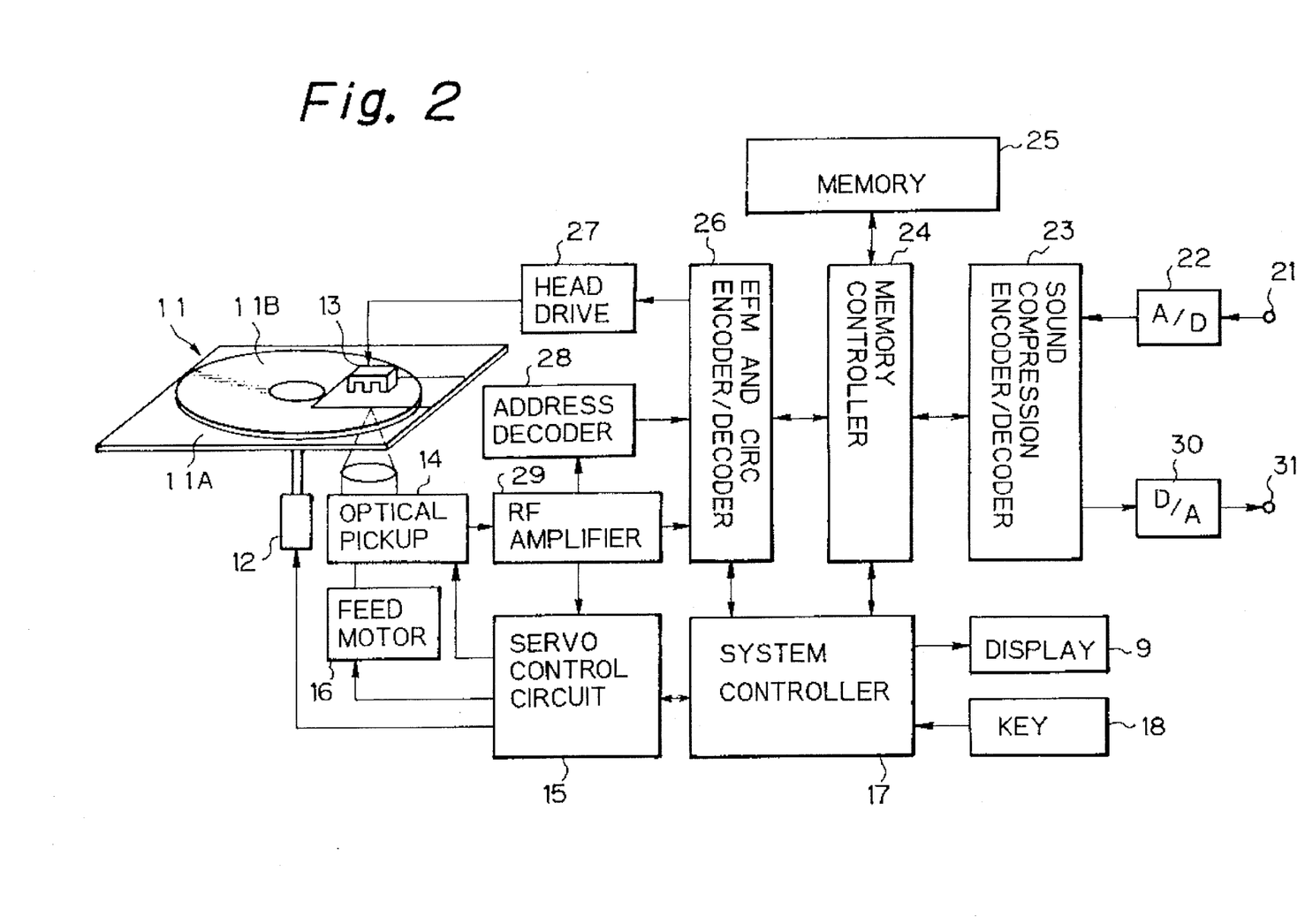
FIG. 2 is a block diagram of an example of the optical disc recording and/or reproducing apparatus to which the present invention has been applied.

FIG. 2 is a block diagram showing the construction of an optical disc recording and/or reproducing apparatus to which the present invention has been applied. Reference numeral 11 indicates a disc cartridge. In a cartridge 11A, an optical disc 11B with a diameter of 64 mm is housed. There are three types of optical discs: a reproduction-only optical disc, a recordable magnetooptical disc, and an optical disc which has both a reproduction-only region and a recordable region. In this example, it is assumed that a magnetooptical disc is housed in the disc cartridge 11.

On the optical disc 11B, a pregroove which is wobbled in the radial direction of the disc is formed according to address data. Data is recorded on or read from the optical disc 11B according to address data which is obtained by detecting the pregroove. As will be described in detail later, a record region of the optical disc 11B comprises a first record region in which data according to information such as conventional music signals are recorded and a second record region, in which catalog information such as so-called TOC (Table Of Contents) is recorded. Record data according to a plurality of programs and a plurality of music programs are recorded on the optical disc 11B along the pregroove.

Reference numeral 12 denotes a spindle motor which rotates the optical disc 11B at a constant linear velocity. The spindle motor 12 is controlled by a servo control circuit 15 which will be described later. Reference numeral 13 indicates a magnetic head which generates an external magnetic field. The magnetic head 13 applies a vertical magnetic field which is modulated according to data to be recorded on the optical disc 11B. Reference numeral 14 denotes an optical pickup which irradiates a light beam onto the optical disc 11B. The magnetic head 13 and the optical pickup 14 are oppositely disposed through the optical disc 11B. The magnetic head 13 and the optical pickup 14 are connected with a connection mechanism (not shown in the figure). Thus, the magnetic head 13 and the optical pickup 14 synchronously travel in the radial direction of the optical disc 11B. Reference numeral 15 indicates a servo control circuit. The servo control circuit 15 generates error signals such as a focusing error signal and a tracking error signal according to output signals of the optical pickup 14 obtained through an RF amplifier 29 which will be described later. The servo control circuit 15 supplies control signals for performing focusing servo control and tracking servo control to the optical pickup 14 based on the generated error signals.

Reference numeral 16 denotes a feed motor which moves the optical pickup 15 in the radial direction of the optical disc 11B. The feed motor 16 moves the optical pickup 14 according to a feed signal received from the servo control circuit 15 so as to allow the optical pickup 14 to perform a track jump operation. In addition, the feed motor 16 receives a low frequency component of the tracking error signal supplied from the servo control circuit 15. When the optical pickup 14 is moved in the radial direction of the optical disc 11B by the feed motor 16, the magnetic head 13 is also moved in the radial direction of the optical disc 11B.

Reference numeral 17 shows a system controller which controls the operation of each constructional portion. The system controller 17 is connected to a display 9 and an input key 18. The input key 18 accords with the power key 2, the OPEN/CLOSE 3, the play key 4, the pause key 5, the stop key 6, the music program selection keys 7A and 7B, and the record key 10 which are disposed on the front panel 1A shown in FIG. 1. On the display 9, there is displayed the catalog information of the optical disc 11B, for example, time information such as total play time, play time of a music program or a program which is being played and, remaining time, and track number, disc name and track name of a music program or a program being played is displayed. The system controller 17 is provided with a timer circuit. As will be described later, the timer circuit automatically switches the display contents of the display 9 for a disc on which a disc name and track names have been recorded is loaded.

Reference numeral 21 denotes an input terminal. Reference numeral 22 indicates an A/D converter which converts an analog audio signal received from the input terminal 21 into a 16-bit digital signal. The sampling frequency of the A/D converter 22 is 44.1 kHz. Reference numeral 23 shows a sound compression encoder/decoder. The sound compression encoder/decoder 23 compresses the amount of the digital signal supplied from the A/D converter 22 to around ⅕ times thereof. The sound compression encoder/decoder 23 compresses and expands the signal with a modified DCT (Discrete Cosine Transform) technique. Reference numeral 24 denotes a memory controller which controls data write operation to a memory 25 and data read operation therefrom. The memory 25 is, for example, a dynamic RAM with a storage capacity of 1 Mbits. The memory 25 temporarily stores data received from the sound compression encoder/decoder 23 through the memory controller 24 when data is recorded on the optical disc 11B. When data is reproduced from the optical disc 11B, data received from an EFM (Eight to Fourteen Modulation) and CIRC (Cross Interleave Reed-Solomon Code) encoder/decoder 26 is temporarily stored in the memory 25 through the memory controller 24. The EFM and CIRC encoder/decoder 26 performs an error correction process for the data being read from the memory 25. In addition, the EFM and CIRC encoder/decoder 26 performs an EFM operation for data. CIRC is used as an error correction code.

Reference numeral 27 indicates a drive circuit for the magnetic head 13. The drive circuit 27 receives record data from the EFM and CIRC encoder/decoder 26. Reference numeral 28 denotes an address decoder which decodes an address signal which has been recorded as a wobbled groove according to a reproduction signal supplied from an RF amplifier 29. Reference numeral 30 indicates a D/A converter which converts a digital signal expanded by the sound compression encoder/decoder 23 into an analog audio signal. The analog audio signal is output from an input terminal 31.

To record data on the optical disc 11B, the optical pickup 14 irradiates a light beam in record level onto the optical disc 11B so as to heat a record layer thereof which is a magnetooptical record layer in this example. At this point, a vertical magnetic field according to the record data is applied from the opposite surface of the optical disc 11B. The magnetooptical record layer as the record layer is magnetized in the direction of the vertical magnetic field when the temperature lowers as the optical beam moves.

Data is recorded cluster by cluster on the optical disc 11B. One cluster consists of 36 sectors. One sector consists of 98 frames corresponding to one subcode block of a compact disc. When data is recorded, the power of the light beam irradiated from the optical pickup 14 should be controlled. In addition, the interleave length of CIRC is 108 frames, which is longer than the length of one sector. Thus, a linking area is required. The first three sectors of one cluster are used for linking sectors. The next one sector is used for subdata. Thus, record data of one cluster is recorded to 32 sectors.

The record position at which data is recorded is designated by addresses wobble-recorded in a groove disposed in a track of the optical disc 11B. The addresses wobble-recorded in the groove are detected by an address decoder 28. The addresses detected by the address decoder 28 are supplied to the EFM and CIRC encoder/decoder 26.

When data is reproduced, a record signal on the optical disc 11B is read out by the optical pickup 14. The reproduction signal on the optical disc 11B is reproduced cluster by cluster. The reproduction signal is supplied to the EFM and CIRC encoder/decoder 26 through an RF amplifier 29. At this point, the optical pickup 14 reads the digital signal on the optical disc 11B at a transmission rate of 1.4 Mbits/sec. The digital signal which is read from the optical disc 11B is sent to the EFM and CIRC encoder/decoder 26. The EFM and CIRC encoder/decoder 26 performs an EFM demodulation and an error correction process for the input digital signal.

The output signal of the EFM and CIRC encoder/decoder 26 is sent to the memory 25 through the memory controller 24. The memory 25 temporarily stores the input signal. The output signal of the memory 25 is supplied to the sound compression encoder/decoder 23. The sound compression encoder/decoder 23 expands the digital signal to around five times thereof.

When the sound compression encoder/decoder 23 receives data at a transmission rate of 300 kbits/sec, it can decompress the input signal and reproduce a continuous sound. On the other hand, as described above, the optical pickup 14 reads a digital signal from the optical disc 11B at a transmission rate of 1.4 Mbits/sec. When the memory 25 has a storage capacity of 1 Mbits, it becomes full in around 0.9 seconds. Even if a digital signal cannot be read from the optical disc 11B due to vibration or the like the reproduction signal can be continuously output for around 3 seconds with the use of data stored in the memory 25. During this time, the optical pickup 14 can be accessed again to the original position so as to read the data again. Thus, so-called "sound jump" can be prevented.

Data decompressed by the sound compression encoder/decoder 23 is supplied to a D/A converter 30. The D/A converter 30 restores the input signal to an analog signal. The analog audio signal is output from the output terminal 31.

Figure 3:
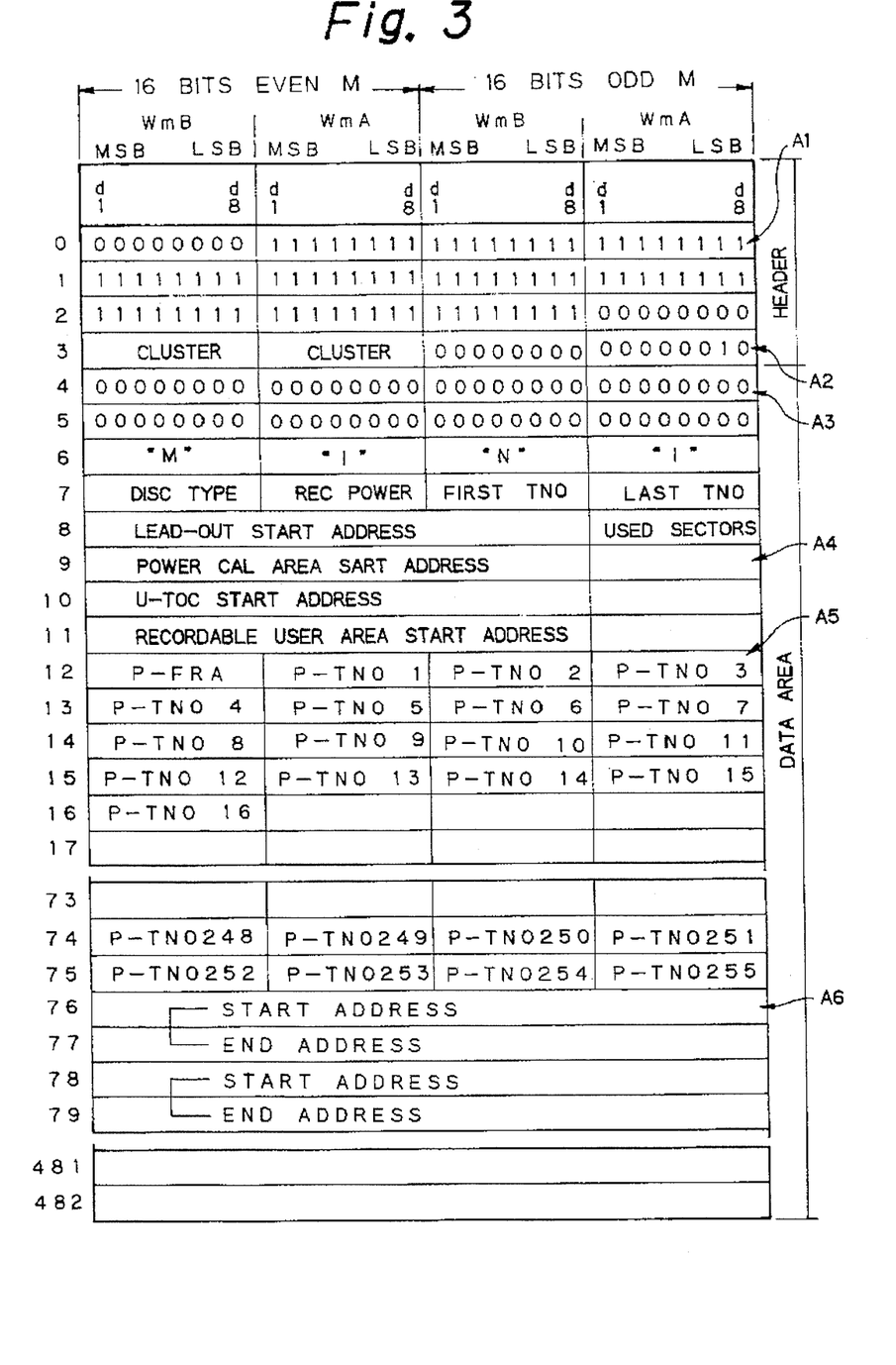
FIG. 3 illustrates a TOC for use with the optical disc to which the present invention has been applied.

On the innermost periphery of the optical disc 11B, a TOG (Table Of Contents) is disposed. On the TOG, information of data recorded on the optical disc 11B is recorded. FIG. 3 shows the construction of the TOG. The TOC consists of a header area and a data area. The header area starts with a fixed sync pattern area A1. The sync pattern area A1 is followed by a header information area A2 which represents a cluster and a sector.

The data area starts with a fixed pattern area A3. The pattern area A3 is followed by an identification information area A4 which contains a mini disc identifier, a disc type identifier indicating which of, for example, reproduction only type, recordable type, or hybrid type having reproduction-only area and recordable area, a record power, a start track number, a last track number, a lead-out start address, a use sector, a power calibration start address, a user TOC start address, and a recordable user area start address. The identification information area A4 is followed by a track number point area A5 which contains P-TNO1, P-TNO2, P-TNO3, . . . , etc. The track number points (P-TNO1, P-TNO2, P-TON3, . . . , etc.) are pointers which represent addresses of information of the start address and end address of each track number. The track number point area A5 is followed by a track information area A6. The information of the start address and end address of each track is recorded on the track information area A6. The addresses of information of the start address and end address of each track are designated by track number points (P-TNO1, P-TNO2, P-TNO3, . . . , etc.).

Figure 4:
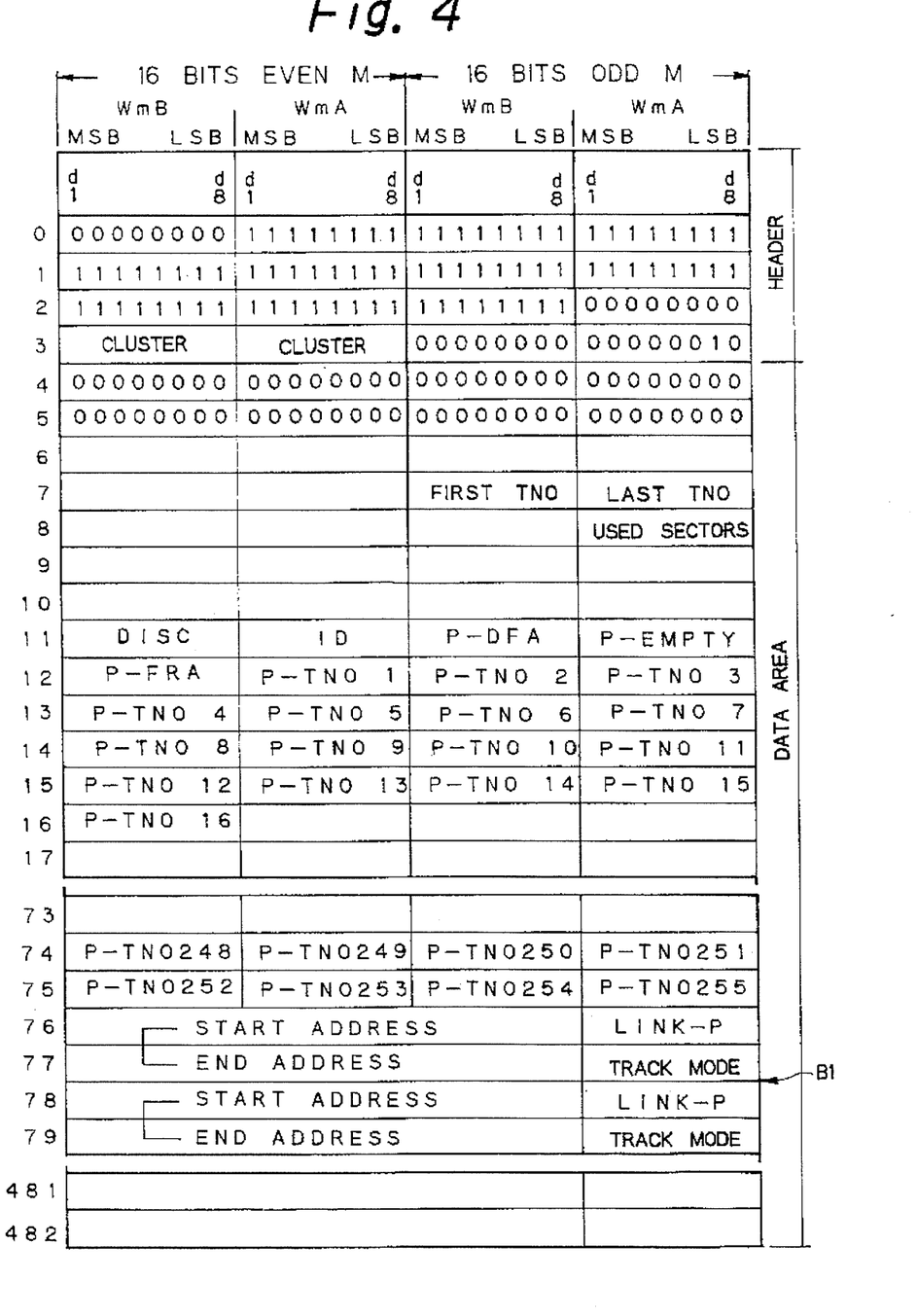
FIG. 4 illustrates a TOC for use with the optical disc to which the present invention has been applied.

In addition, to manage an audio signal being recorded, the optical disc 11B is provided with a user TOC. FIG. 4 shows the construction of the user TOC. The basic construction of the user TOC is the same as that of the above-mentioned TOC. The user TOC contains information named Link-P (denoted by B1) as track information. The Link-P represents a track which is preceded by a relevant track. Thus, to change the sequence of music programs, it is not necessary to change the sequence of tracks. In other words, all track information can be managed on the user TOC.

When a disc is loaded, the information of the TOCs is stored at part of the memory 25. The user TOC is updated in the memory 25. For example, when a disc is ejected, the updated user TOC is recorded on the optical disc 11B.

Figure 5:
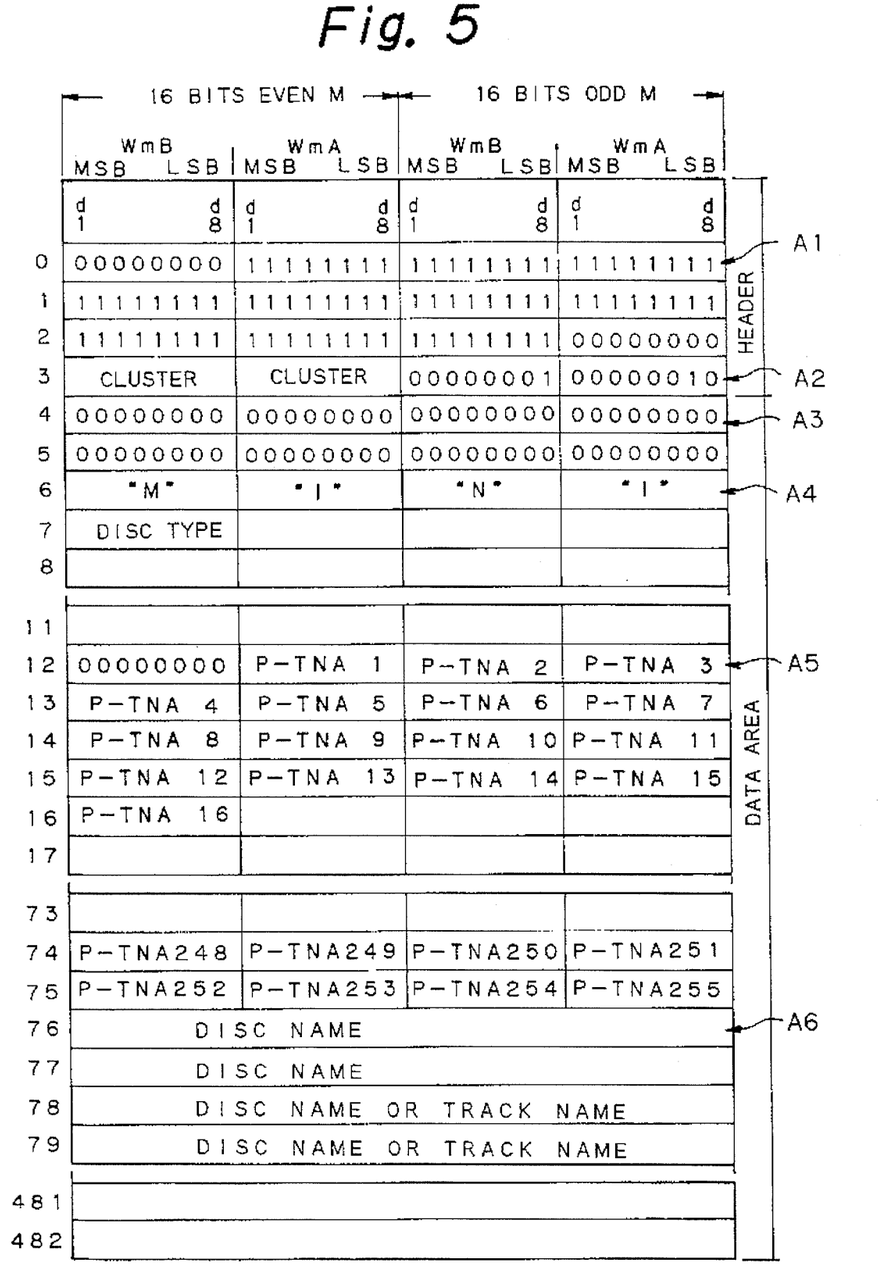
FIG. 5 illustrates a TOC for use with the optical disc to which the present invention has been applied.

With such an optical disc, a disc name and a track name can be recorded on a TOC. FIG. 5 shows an TOC on which a disc name and a track name have been recorded. As shown in FIG. 5, in an area A6, a disc name and a track name are recorded.

To determine whether or not a disc name and track names have been recorded on the disc, whether or not the beginning of information of each name in the area A6 is "00" (null) is checked. When information of a name has been recorded, the beginning of information of each name in the area A6 is not "00". Otherwise, the beginning is null. The name information is read from the beginning until information becomes "00".

A display method according to a first embodiment of the present invention will now be described hereinbelow with reference to FIGS. 6 to 9.

Figure 6:
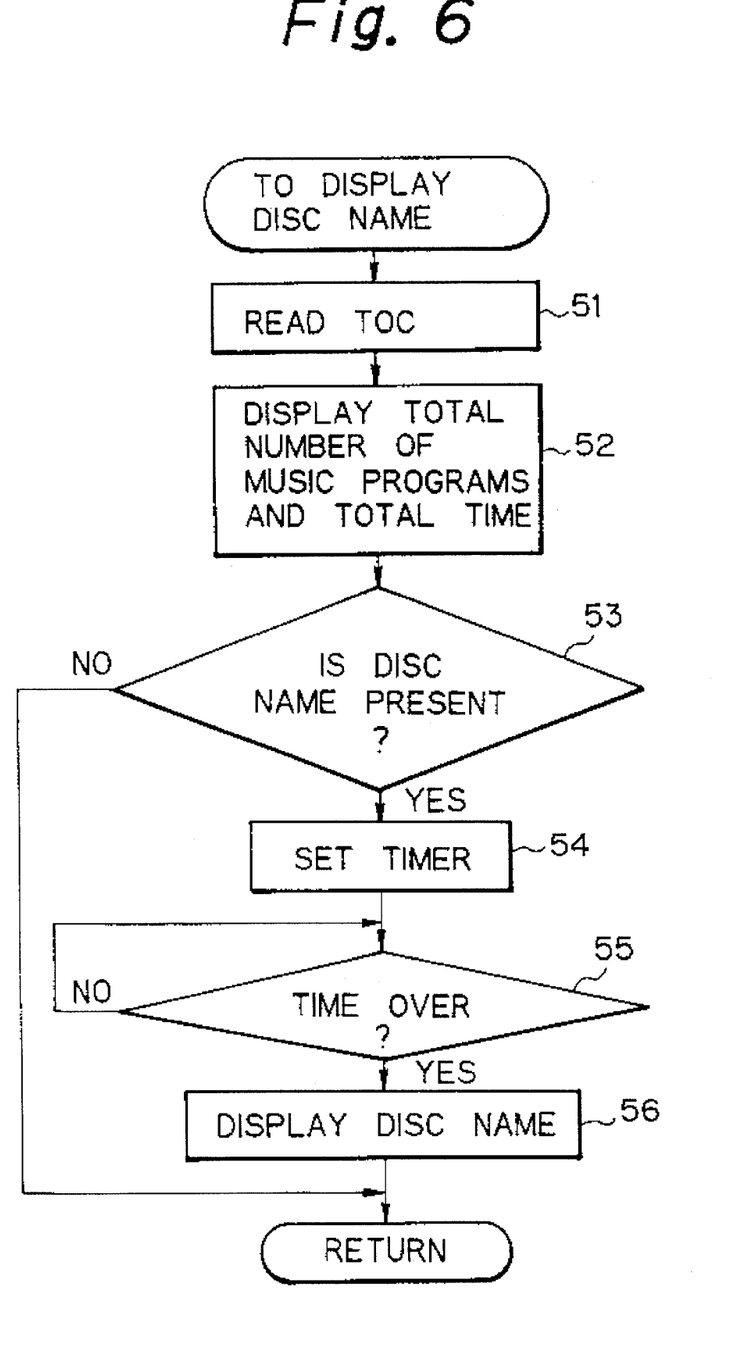
FIG. 6 is a flow chart illustrating a first embodiment according to the present invention.

FIG. 6 shows a process for automatically displaying a disc name when a disc is loaded. As shown in FIG. 6, when a disc is loaded, a TOC thereon is accessed (at step 51). With the information of the TOC, information such as total number of music programs and total play time is displayed (at step 52). After the total number of music programs, the total play time, and so forth are displayed, it is determined whether or not the TOC contains a disc name (at step 53). As mentioned above, the determination is performed by checking whether or not information indicating a disc name begins with null. When the TOC does not contain a disc name, the total number of music programs, the total play time, and so forth are displayed. When the TOC contains a disc name, a timer circuit of the system controller 17 is set (at step 54). When it is detected that a predetermined time elapsed by the timer circuit (at step 55), the disc name is displayed (at step 56).

Figure 7:
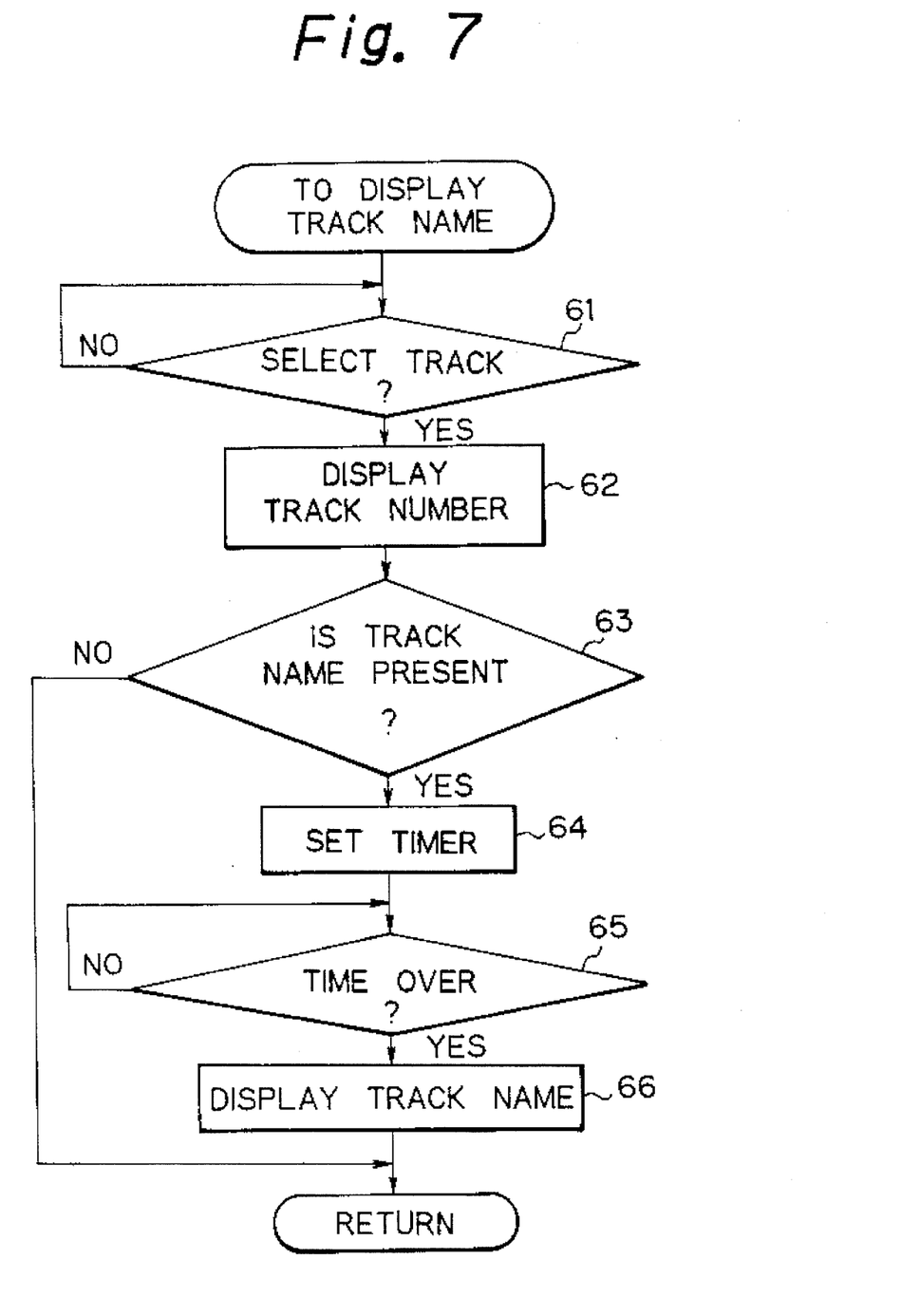
FIG. 7 is a flow chart illustrating the first embodiment according to the present invention.

FIG. 7 shows a process for automatically displaying a track name. As shown in FIG. 7, when a track is selected while a music program is being reproduced (at step 61), the track number is displayed (at step 62). Thereafter, it is determined whether or not the TOC contain a track name (at step 63). The determination whether or not the TOC contains a track name is performed by checking whether or not information indicating a track name begins with null in the same manner as that of the determination of the disc name. When the TOC does not contain a track name, the track number is continuously displayed. When the TOC contains a track name, the timer circuit of the system controller 17 is set as described above (at step 64). Thereby, it is determined whether or not a predetermined time elapsed by a count value of the timer circuit (at step 65). When the predetermined time elapsed, a track name is displayed (at step 66).

In the normal state, after a disc name is displayed for a predetermined time, it may be changed to the indications of the total number of music programs and the total play time.

Figure 8:
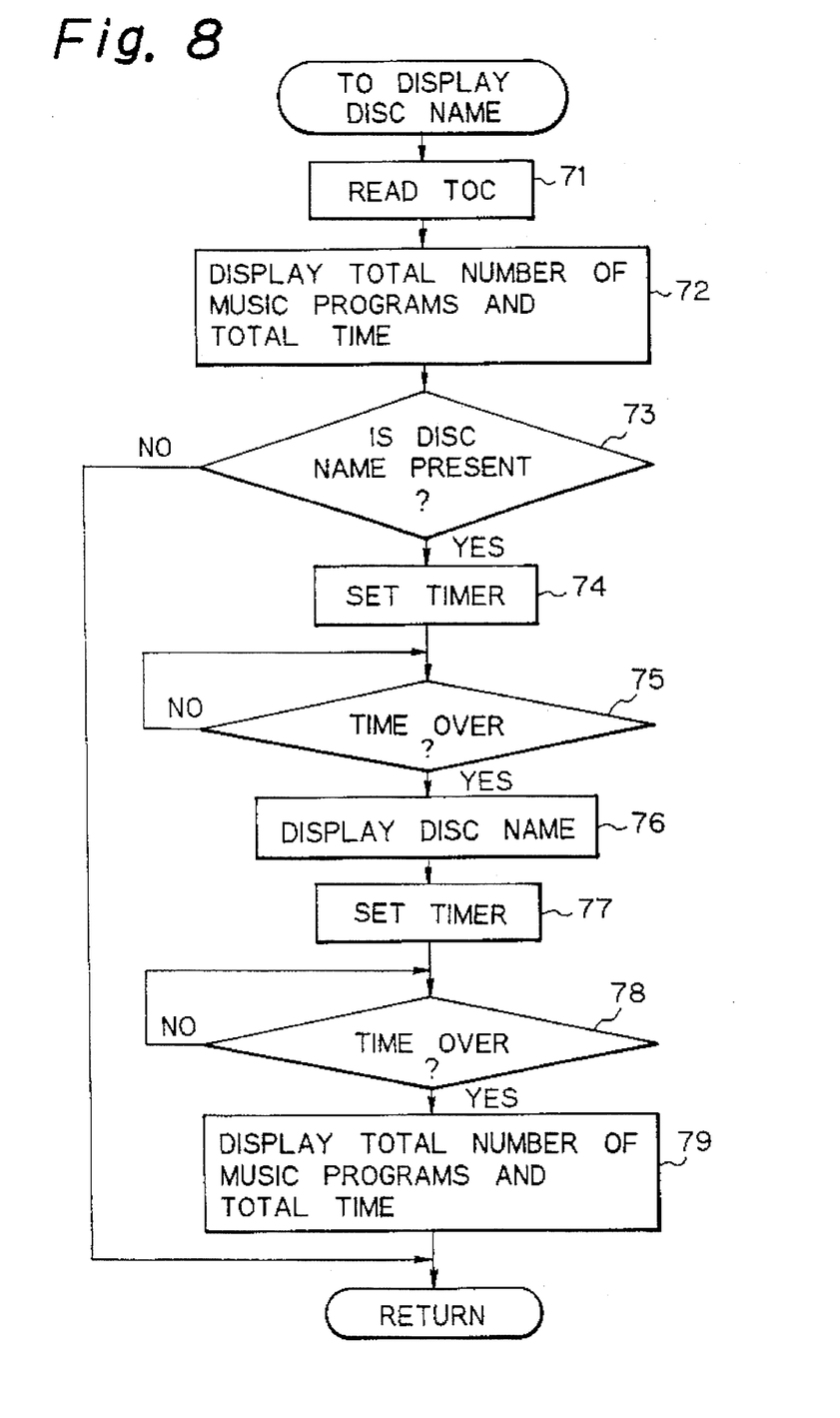
FIG. 8 is a flow chart illustrating the first embodiment according to the present invention.

In other words, in the case that a disc name is displayed, as shown in FIG. 8, when a disc is loaded, a TOC is accessed (at step 71). With the information of the TOC, the total number of music programs and the total play time are displayed (at step 72). After the total number of music programs, the total play time, and so forth are displayed, it is determined whether or not the TOC contains a disc name (at step 73). When the TOC does not contain a disc name, the total number of music programs, the total play time, and so forth are displayed. When the TOC contains a disc name, the timer circuit of the system controller 17 is set (at step 74). When it is detected that a predetermined time elapsed by the timer circuit (at step 75), the disc name is displayed (step 76). Thereafter, the timer circuit is set (at step 77). When a predetermined time elapsed (at step 78), the total number of music programs and the total play time are displayed (at step 79).

Figure 9:
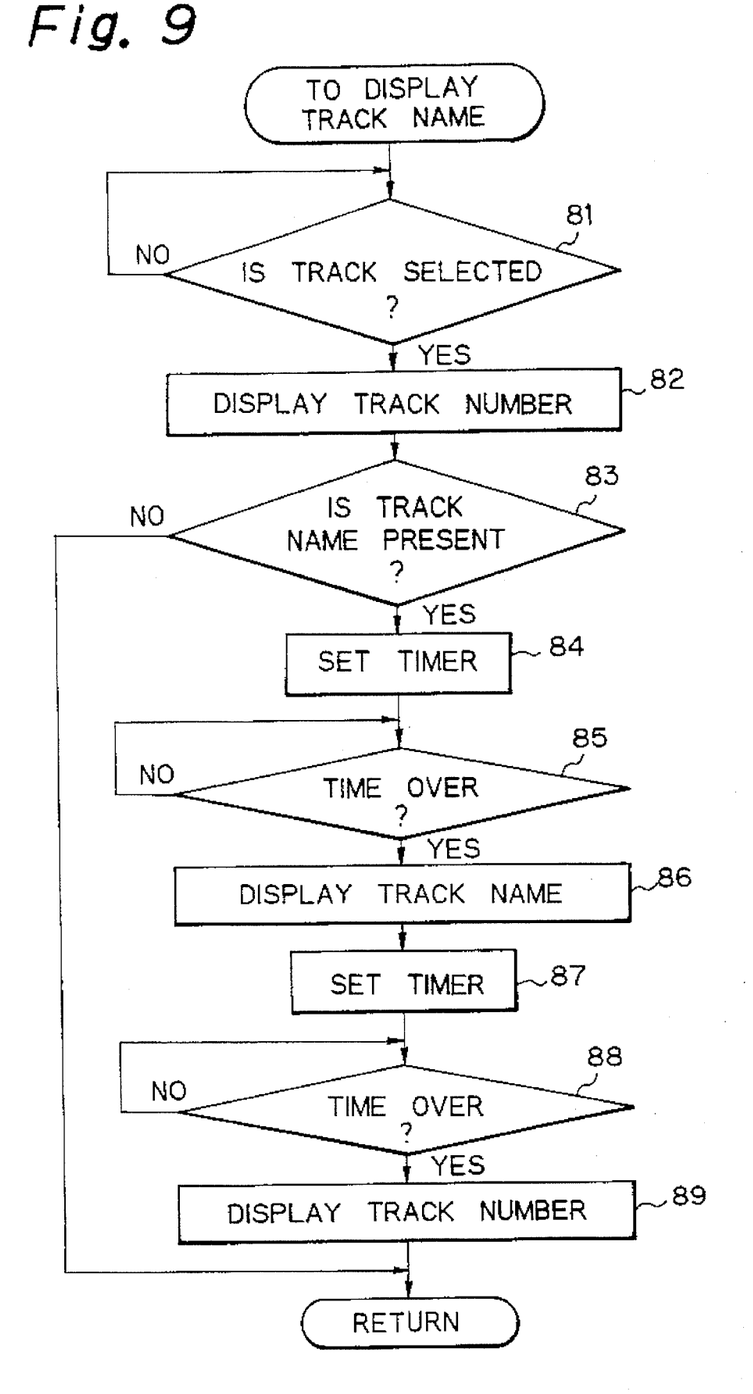
FIG. 9 is a flow chart illustrating the first embodiment according to the present invention.

In the case that a track name is automatically displayed, as shown in FIG. 9, when a track is selected while a music program is being reproduced (at step 81), a track number is displayed (at step 82). Thereafter, it is determined whether or not a track name is present (at step 83). When a track name is absent, the track number is continuously displayed. When a track name is present, the timer circuit of the system controller 17 is set (at step 84). Thus, it is determined whether or not a predetermined time elapsed by a count value of the timer circuit (at step 85). When the predetermined time elapses, a track name is displayed (at step 86). Thereafter, the timer circuit is set again (at step 87). When it is detected that a predetermined time elapsed by the timer circuit (at step 88), the total number of music programs and the total play time are displayed (at step 89).

Figure 10:
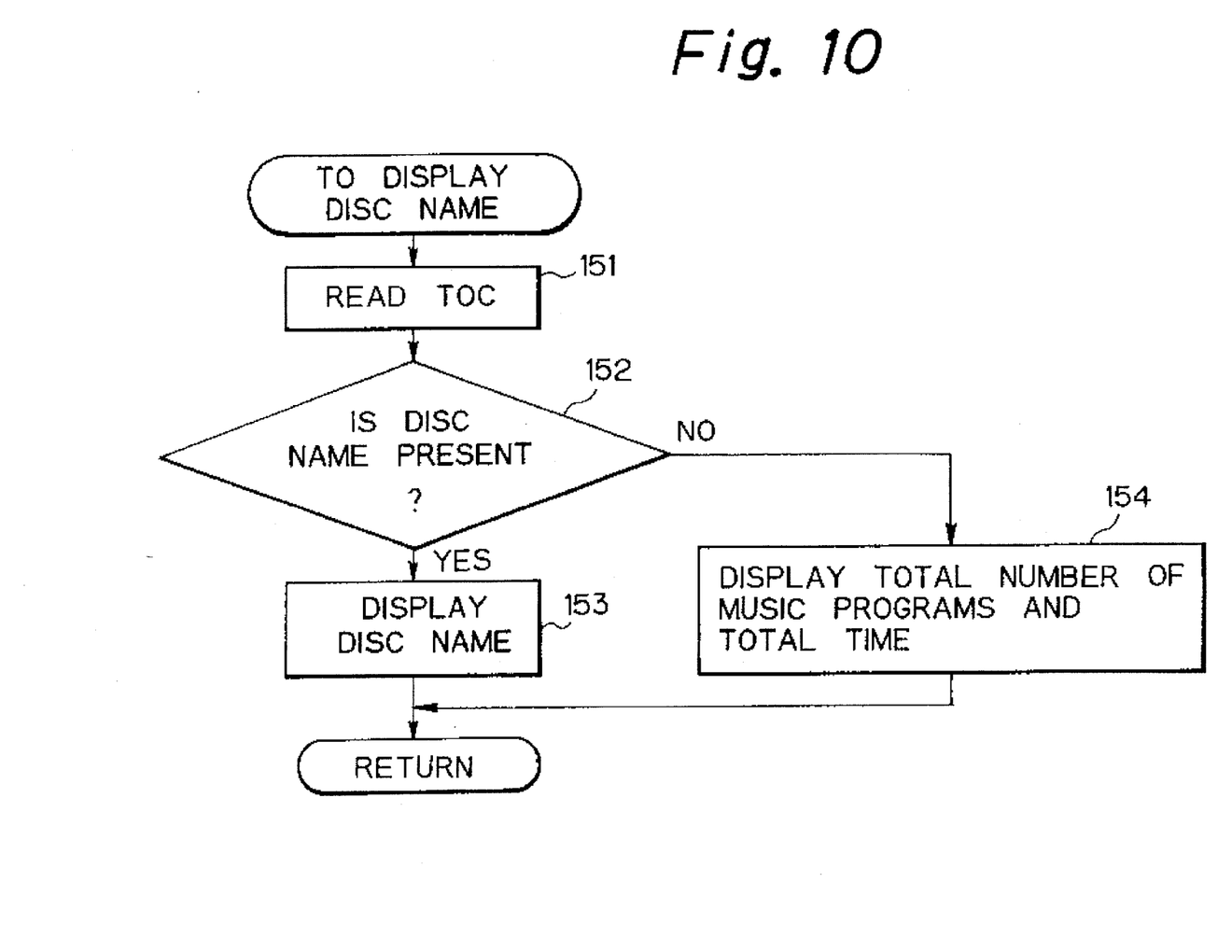
FIG. 10 is a flow chart illustrating a second embodiment according to the present invention.

FIG. 10 is a flow chart showing a process for automatically displaying a disc name. When a disc is loaded, the TOC recorded on the disc is read. The information of the TOC is temporarily stored in part of the memory 25. The information of the TOC is read (at step 151). With the information of the TOC, it is determined whether or not there is a disc name (at step 152). The determination whether or not there is a disc name is performed by checking whether or not information indicating a disc name begins with null. When a disc name has been recorded, it is displayed on the display 9 (at step 153). When a disc name has not been recorded, the total number of music programs and total play time are displayed on the display 9 (at step 154).

Figure 11:
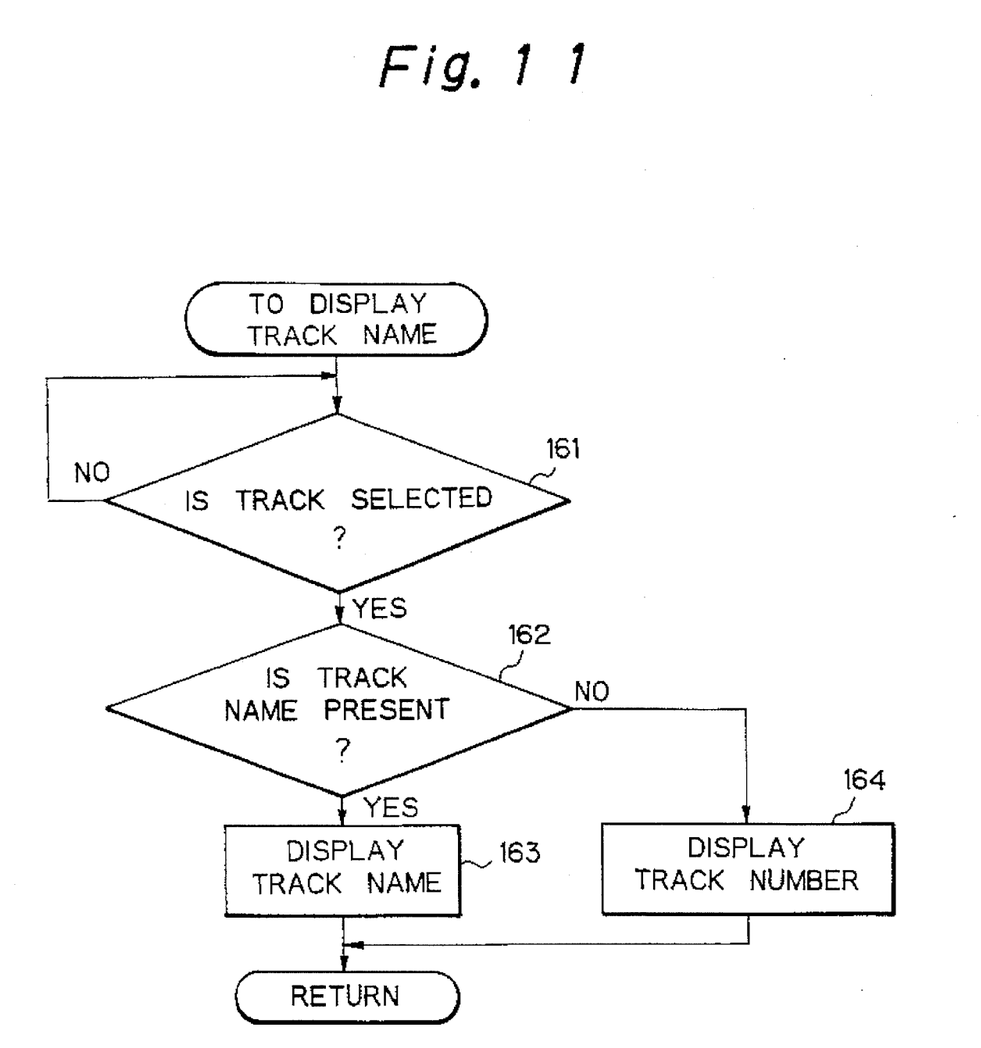
FIG. 11 is a flow chart illustrating the second embodiment according to the present invention.

FIG. 11 is a flow chart showing a process for automatically displaying a track name according to an access command. When a disc is loaded, the TOC recorded thereon is read. The information of the TOC is stored in part of the memory 25. When a music program number is selected from the disc with the music select keys 7A and 7B, that is, when an access command is given (at step 161), it is determined whether or not a track name for a music program designated by the music select keys 7A and 7B has been recorded on the disc (at step 162). The determination whether or not there is a track name is performed by checking whether or not information indicating a track name begins with null. When a track name for the designated music program has been recorded, the track name is displayed on the display 9 (at step 163). When a track name for the designated music program has not been recorded, the music program number is displayed on the display 9 (at step 164).

Figure 12:
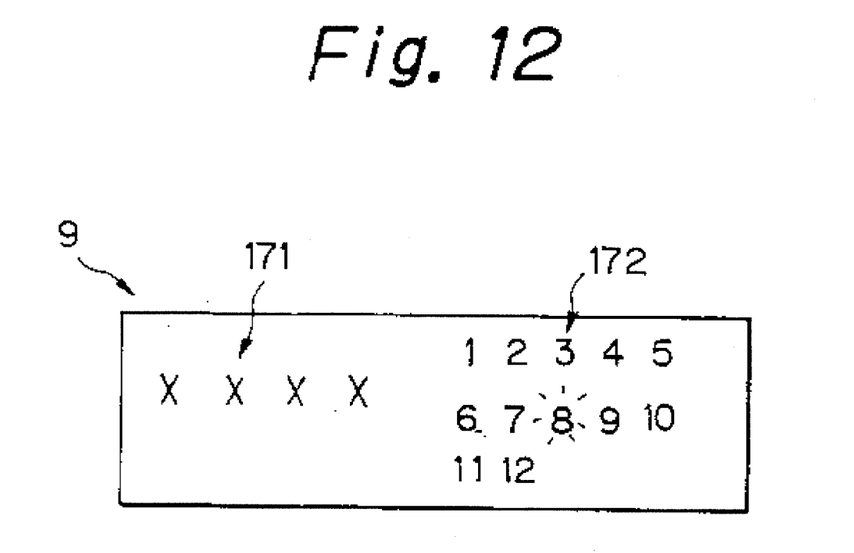
FIG. 12 is a schematic diagram showing the displaying state of a display in the second embodiment according to the present invention.
Figure 13:
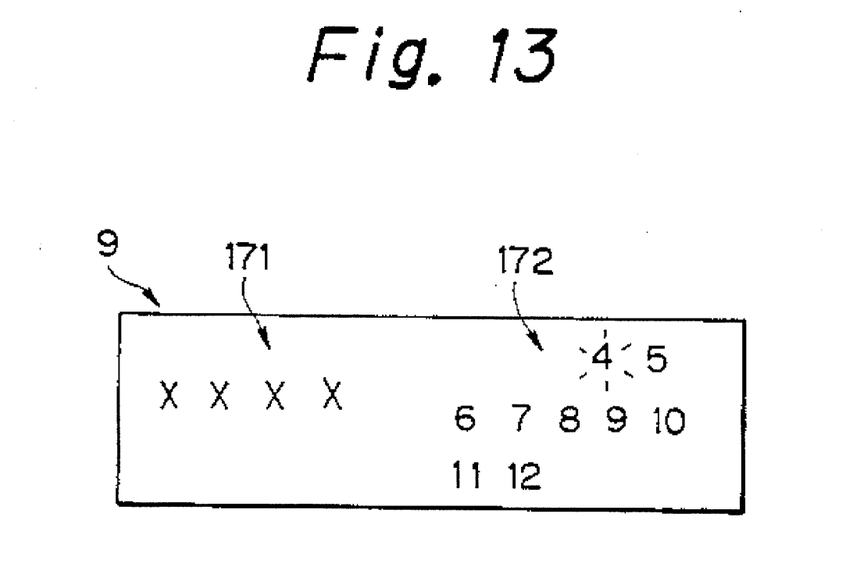
FIG. 13 is a schematic diagram showing the displaying state of a display in the second embodiment according to the present invention.

FIGS. 12 and 13 show examples of indications displayed on the display 9 when a music program number is selected, that is, when an access command is given. The display 9 has a character display area 171 and a number display area 172.

FIG. 12 shows an indication of the display 9 while no music program is being reproduced from a disc. As shown in FIG. 12, when a track name has been recorded on the disc, the track name is displayed in the character display area 171. Moreover, in the number display area 172, music program numbers which can be played are displayed while no music program is being reproduced. In the number display area 172, a music program number which has been selected blinks.

FIG. 13 shows an indication of the display 9 while a music program is being reproduced. As shown in FIG. 13, while a music program is being reproduced, when a track name has been recorded, it is displayed in the character display area 171. In the number display area 172, music program numbers which have not been played are displayed. In addition, a music program number which is being played blinks.

What is claimed is:

1. A display method for use with a disc having a first record region for recording data and a second record region for recording at least catalog information of the data recorded on the first record region, the method comprising the steps of:

(a) detecting whether or not a disc name, which identifies the data recorded in the first record region, has been recorded in the second record region of the disc;

(b) displaying the catalog information on a display portion if the disc name has not been recorded in the second record region of the disc; and (c) displaying the disc name on the display portion if the disc name has been recorded in the second record region of the disc.

2. The display method as set forth in claim 1, wherein in step (c) the catalog information recorded in the second record region is displayed on the display portion for a predetermined time before the disc name is displayed on the display portion.

3. The display method as set forth in claim 2, wherein in step (c) the disc name is displayed for a predetermined time, and after the predetermined time the catalog information recorded in the second record region is displayed on the display portion.

4. A display method for use with a disc having a first record region for recording data and a second record region for recording at least catalog information of the data recorded on the first record region, the method comprising the steps of:

(a) detecting whether or not a track name, which identifies a portion of the data recorded in the first record region, has been recorded on the second record region of the disc;

(b) displaying the catalog information on a display portion if the track name has not been recorded on the second record region; and (c) displaying the track name on the display portion if the track name has been recorded in the second record region.

5. The display method as set forth in claim 4, wherein in step (c) the catalog information recorded in the second record region is displayed on the display portion for a predetermined time before the track name is displayed on the display portion.

6. The display method as set forth in claim 5, wherein in step (c) the track name is displayed for a predetermined time, and after the predetermined time the catalog information recorded in the second record region is displayed on the display portion.

7. A disc reproducing apparatus for reproducing recording data from a disc, the disc having a first record region on which the recording data is recorded and a second record region on which is recorded at least catalog information of the data recorded in the first record region, the disc reproducing apparatus comprising:

a head that reads the recording data and the catalog information from the disc;

a memory for storing the catalog information read from the disc by the head;

a display portion;

determination means for determining if one or both of a disc name, which identifies the data recorded on the first record region, and a track name, which identifies a portion of the data recorded on the first record region, has been recorded in the second record region of the disc according to the catalog information read by the head; and control means for, when the determination means determines that neither of a disc name and a track name has been recorded in the second record region, reading the catalog information from the memory and displaying the catalog information on the display portion and for, when the determination means determines that one or both of the disc name and the track name has been recorded in the second record region, reading the one or both of the disc name and the track name from the memory and displaying the one or both of the disc name and the track name on the display portion.

8. The disc reproducing apparatus as set forth in claim 7, wherein the control means includes:

a display switcher for switching the display contents of the display portion responsive to the determination means.

* * * * *